(12) United States Patent
Tyren et al.

(10) Patent No.: US 7,075,439 B2
(45) Date of Patent: Jul. 11, 2006

(54) MARKER FOR REMOTE DETECTION OF ARTICLES

(75) Inventors: Carl Tyren, Monaco (MC); Helge Lunau, Nivå (DK)

(73) Assignee: Demodulation, Inc., Westwood, NJ (US)

(*) Notice: Subject to any disclaimer, the term of this patent is extended or adjusted under 35 U.S.C. 154(b) by 0 days.

(21) Appl. No.: 10/265,136

(22) Filed: Oct. 7, 2002

(65) Prior Publication Data

US 2004/0070502 A1 Apr. 15, 2004

(51) Int. Cl.
*G09B 13/14* (2006.01)

(52) U.S. Cl. ............... 340/572.3; 340/551; 340/572.1; 340/572.2; 340/572.6; 340/572.9; 73/579

(58) Field of Classification Search ............ 340/572.3, 340/572.1, 572.2, 572.8, 10.1, 5.8, 572.5, 340/572.6, 572.7, 572.9, 568.1, 551, 572.4; 428/611; 73/579

See application file for complete search history.

(56) References Cited

U.S. PATENT DOCUMENTS

| | | | | |
|---|---|---|---|---|
| 3,754,226 A | * | 8/1973 | Fearon | 340/572.3 |
| 5,867,098 A | * | 2/1999 | Angel et al. | 340/551 |
| 6,177,870 B1 | * | 1/2001 | Lian et al. | 340/572.5 |
| 6,229,444 B1 | * | 5/2001 | Endo et al. | 340/572.6 |
| 6,373,387 B1 | * | 4/2002 | Qiu et al. | 340/572.1 |
| 6,688,162 B1 | * | 2/2004 | Bachas et al. | 73/64.42 |

* cited by examiner

*Primary Examiner*—Davetta W. Goins
(74) *Attorney, Agent, or Firm*—Ernest D. Buff & Associates, LLC; Ernest D. Buff

(57) ABSTRACT

A marker for remote detection of articles has an elongated sensor element with magnetic and electric properties. The elongated sensor element provides an electromagnetic reply signal when receiving an electromagnetic input signal. The elongated sensor element modulates the electromagnetic reply signal in response to an external magnetic modulating field. The marker also has means positioned in a vicinity of the elongated sensor element in the marker. The means is adapted to influence either the magnetic or the electric properties of the elongated sensor element in response to incident electromagnetic or magnetic energy, so that either the electromagnetic reply signal itself or the modulation thereof is substantially changed from an active state to a deactivated state.

4 Claims, 3 Drawing Sheets

MARKER FOR REMOTE DETECTION OF ARTICLES

TECHNICAL FIELD

The present invention relates to markers for use in systems for remote detection of articles, such as electronic anti-pilferage systems in shops. More specifically, the present invention is directed at a marker of the type comprising an elongated sensor element having magnetic and electric properties and being adapted to provide an electromagnetic reply signal when receiving an electromagnetic input signal, wherein the elongated sensor element is also capable of modulating its electromagnetic reply signal in response to an external magnetic modulating field.

PRIOR ART

Markers of the above type, and electronic article surveillance systems for their detection, are disclosed in e.g. WO 97/29463, WO 97/29464 and WO 98/36393. The markers disclosed in these documents each comprise a wire-shaped sensor element of amorphous or nano-crystalline metal alloy, typically having a diameter of the order of 10–100 µm. In some of the markers the wire-shaped sensor element has a thin glass coating. An important feature of the amorphous or nano-crystalline metal alloy is that its permeability may be controlled through an alternating magnetic modulating field. Through a physical effect known as Giant Magneto-impedance, the amplitude of the electromagnetic reply signal from the marker is modulated by the magnetic modulating field, when the marker receives an electromagnetic input signal (interrogation signal). The modulation in amplitude of the reply signal is detected and used for determining the presence of the marker in a detection zone.

Thanks to the very thin amorphous or nano-crystalline wires used in the markers above, they are particularly well suited for "source tag" applications, where the respective article is provided with its marker already at the time of manufacturing or packaging. If the article in question is a piece of clothing, the thin amorphous or nano-crystalline wire may be sewn into a collar tip or a cuff, or may alternatively be woven into the cloth of the piece of clothing, be attached to a brand label, etc. Alternatively, the thin wire may be included in a packaging material consisting of e.g. cardboard or plastic.

It is often desired to be able to deactivate a marker for an electronic article surveillance system. When a sales item is sold the tag is normally removed from the object or deactivated. This is made possible, as the sales assistant knows the position of the tag or in most cases can see the tag. In cases where it is wished to conceal the tag or embed the tag into the sales item or packaging the existing methods are not sufficient.

WO 98/36394 discloses a method of deactivating a marker of the above type, wherein the marker is deactivated by applying thermal energy, preferably in the form of microwave radiation, to the sensor element, so that the temperature of the amorphous or nano-crystalline material exceeds its crystallization temperature and the sensor element is crystallized. However, such a structural change of the material will appear only when the temperature exceeds above 450° C. The amount of energy required in order to reach such temperatures causes serious shielding problems in order to protect shop personnel and customers against radiation, as the security distance to the energy source will be as long as 0.5 m. This causes handling problems at the checkout counters in shops using such systems, and the shielding issue becomes very complex.

SUMMARY OF THE INVENTION

It is an object of the present invention to provide an improvement to the electromagnetic detectable marker by the use of low energy microwaves. More specifically an object is to be safely deactivated and at the same time reduce the human exposure to the emitted energy by substantially reducing the energy required for deactivating a marker of the above type.

Deactivated in this sense means for this purpose that a designed detection system will not be able to detect the marker thus not set off an alarm signal.

The above objects are achieved through a marker according to the enclosed independent patent claim.

More specifically, an improved marker of the above type has been achieved by the provision of additional means positioned in a vicinity of the elongated amorphous or nanocrystalline wire-shaped sensor element in the marker. Aforesaid means is adapted to influence either the magnetic or the electric properties of the elongated sensor element in response to incident electromagnetic or magnetic energy, so that either the electromagnetic reply signal itself or the modulation thereof is substantially changed from an active state to a deactivated state. According to some embodiments, the means may be realized as a meltable coating containing electrically conductive powder, or as a meltable coating in combination with an electrically conductive wire, strip or ribbon, which is wound circumferentially or spirally around the coated sensor element.

Other objects, features and advantages of the present invention will appear from the following detailed disclosure of different embodiments, from the attached drawings as well as from the subclaims.

BRIEF DESCRIPTION OF THE DRAWINGS

The present invention will now be described in more detail, reference being made to the accompanying drawings, in which.

DETAILED DISCLOSURE OF THE INVENTION

Figure 1:
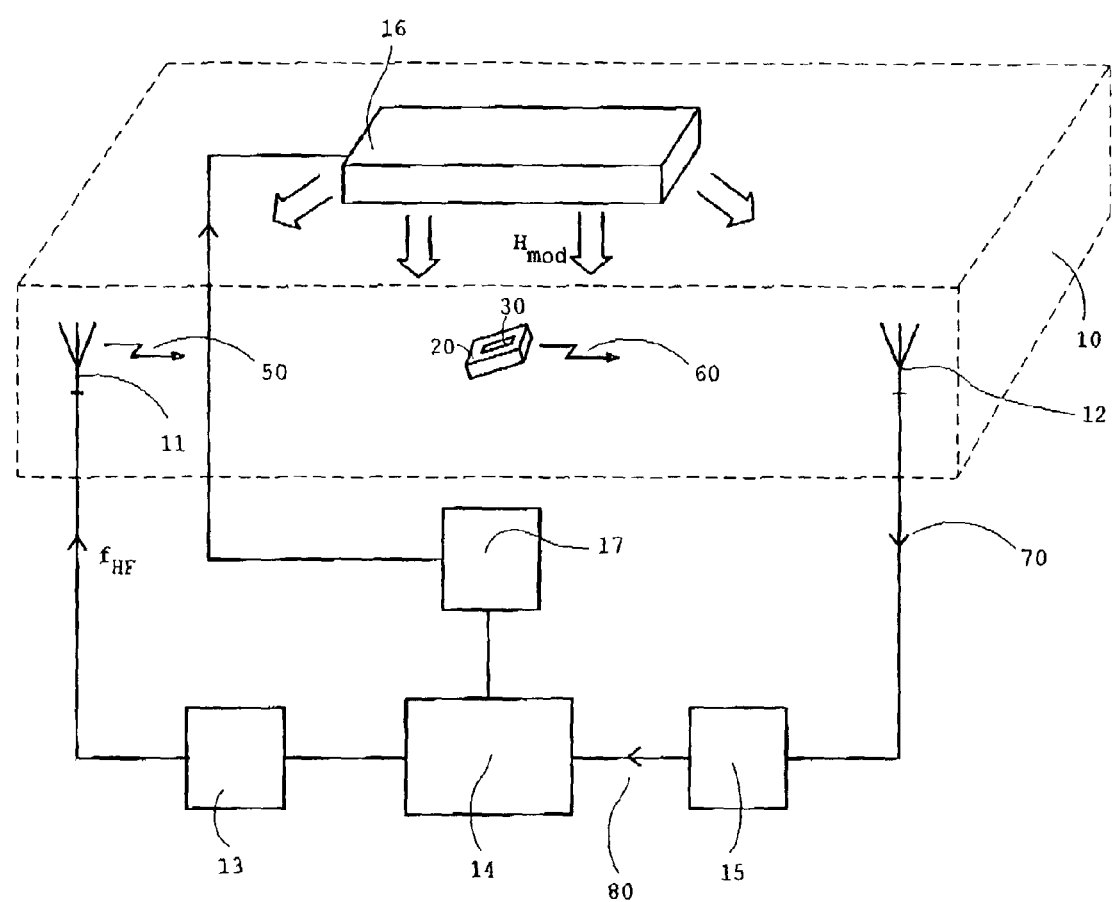
FIG. 1 is a schematic illustration of an electronic article surveillance system, in which a marker according to the present invention may be used.

FIG. 1 illustrates an article identification system for detecting a marker 30 attached to an object 20. A system similar to the one illustrated in FIG. 1 is thoroughly disclosed in WO97/29463, WO097/29464 and WO98/36393, all of which are fully incorporated herein by reference. A transmitter antenna 11 and a receiver antenna 12 are arranged in a detection zone 10. The transmitter antenna 11 is operatively connected to an output stage 13, which in turn is connected to a controller 14. The output stage comprises various commercially available driving and amplifying circuits and means for generating an alternating electric current of high frequency $f_{HF}$, said current flowing back and forth through the transmitter antenna 11 when supplied thereto, wherein a high-frequency electromagnetic field is generated around the transmitter antenna. This electromagnetic field is used, as will be described in more detail below, for interrogating the marker 30 within the detection zone 10, so that the marker will transmit, at the reception of an electromagnetic input or interrogation signal 50 from the transmitter antenna 11, an electromagnetic reply signal 60, which is received by the receiver antenna 12 and transformed into a corresponding electric signal 70.

The receiver antenna 12 is operatively connected to an input stage 15, which comprises conventional means with amplifying and signal processing functions, such as band-pass filtering and amplifying circuits. The input stage 15 also comprises means for demodulating the received signal 70 and supplying it, as a final reply signal 80, to the controller 14.

The transmitter antenna 11 as well as the receiver antenna 12 thus have the purpose of converting, in a known way, between an electrical signal of high frequency and an electromagnetic signal. The antennas may be helically formed antennas with rotating polarization (for optimal coverage in all directions), or alternatively conventional end-fed or center-fed halfwave whip antennas. Other known antenna types are however equally possible.

The detection zone 10 is moreover provided with means 16, such as a coil, for generating a magnetic modulating field $H_{mod}$. The means 16 is connected to the controller 14 via a driving stage 17. The driving stage 17 comprises means for generating a modulating current, which is supplied to the means 16, wherein the magnetic modulating field $H_{mod}$ is generated in essential portions of the detection zone 10. The magnetic modulating field $H_{mod}$ may have a frequency of about 500–800 Hz, and the electromagnetic excitation and reply signals may have a frequency within the GHz band, such as 1.3 GHz or 2.45 GHz. frequencies outside these ranges are however also possible.

As described above, the article 20, which has been schematically illustrated in FIG. 1 in the form of a box-shaped package, is provided with the marker 30 according to the invention, which is illustrated in more detail in the remaining drawings.

Figure 2:
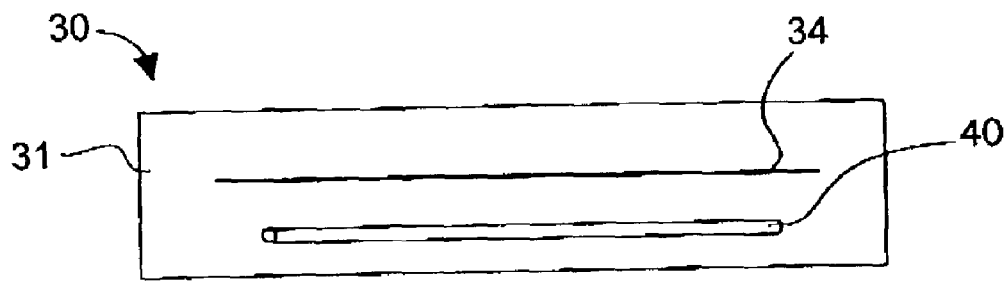
FIG. 2 is a schematic topview of a marker according to a first embodiment of the invention.

As shown in FIG. 2, a first embodiment of the marker 30 comprises an elongated sensor element 34, which is placed on a thin non-magnetic substrate 31 (such as paper or plastics) and consists of a thin wire of an amorphous or nano-crystalline cobalt-rich metal alloy, as suggested in the patent publications referred to in the beginning of this section. Consequently, the elongated sensor element 34 has magnetic as well as electric properties. The purpose of the sensor element 34 is to modulate the received electromagnetic input signal 50 by the frequency of the magnetic modulating field $H_{mod}$ and provide a modulated reply signal 60. This modulation in amplitude of the electromagnetic reply signal 60 gives the marker 30 a signature in the detection zone 10, which may be detected by the controller 14 through the received signals 70 and 80, as described above.

As explained in the patent publications referred to above, an alternating electric current will be induced in the wire-shaped sensor element 34, when it is exposed to the electromagnetic input signal 50. Thanks to the magnetic properties of the amorphous or nano-crystalline metal alloy of the sensor element 34, the permeability of the metal alloy may be controlled through the magnetic modulating field $H_{mod}$. More specifically, the amplitude of the electromagnetic reply signal 60 may be controlled through the giant-magnetoimpedance effect or skin-depth effect in the amorphous or nano-crystalline sensor element material. The electric impedance of the wire-shaped sensor element 34 will depend on the permeability and resistivity of the amorphous or nano-crystalline metal alloy, as well as the frequency of the electromagnetic input signal 50. Since the impedance depends on the permeability, and the permeability is changed through the magnetic modulating field $H_{mod}$, also the amplitude of the current running through the wire-shaped sensor element 34 will change as a function of the magnetic modulating field $H_{mod}$. Thus, ultimately, the electromagnetic reply signal 60, which is generated by the running current within the sensor element 34, will be modulated by the magnetic modulating field $H_{mod}$ and exhibit a signature or indication of the presence of the marker 30 within the detection zone 10.

The amorphous or nano-crystalline magnetic material of the material sensor element 34 is very soft from a magnetical point of view and has a particular magnetic anisotropy, which makes its magnetic state easily modifiable in the alternating magnetic bias field $H_{mod}$. Therefore, a marker comprising an elongated sensor element 34 will normally be active (i.e. responsive to incident electromagnetic interrogation signals 50) all the time, as is the case with the above-described markers of the prior art.

Referring back to FIG. 2, there is provided on the substrate 31 a semi-hard magnetic wire 40, which is positioned adjacently to, and preferably in parallel with, the sensor elements 34. According to one aspect of the invention, the elongated sensor element 34 may be activated or deactivated depending on whether the adjacent semi-hard magnetic wire 40 is magnetized or demagnetized. Assuming initially that the semi-hard magnetic wire 40 is not magnetized, the marker 30 will be active in a normal operative condition and thus be responsive to electromagnetic input signals 50 in the detection zone 10. However, if the marker 30 is exposed to a continuous magnetic field, produced for example by an external permanent magnet, the semi-hard magnetic wire 40 will be magnetized. Alternatively, the wire 40 may be magnetized by exposing the marker 30 to a short magnetic pulse. The wire 40 will remain magnetized after the external permanent magnet has been removed (or after the short magnetic pulse has ended), wherein the amorphous or nano-crystalline sensor element 34, which is soft magnetic, will be magnetically blocked and be insensitive to the magnetic modulating field $H_{mod}$. A deactivated marker 30 will still produce an electromagnetic reply signal 60, which, however, will not be modulated by the magnetic modulating field $H_{mod}$. It is possible to reactivate the marker 30 by demagnetizing the semi-hard magnetic wire 40. This may be obtained by introducing the marker 30 in an alternating magnetic field having a slowly decreasing amplitude, for instance by moving the marker 30 away from the magnetic field source. Alternatively, the marker 30 may be exposed to a magnetic degaussing signal. Once the semi-hard magnetic wire 40 has been demagnetized, the sensor element 34 will again be susceptible of the magnetic modulating field $H_{mod}$ and will thus generate a normal modulated electromagnetic reply signal 60.

The cycle of magnetization and demagnetization of the semi-hard magnetic wire 40 can be repeated many times, wherein the marker 30 may also be deactivated and activated a corresponding number of times.

The semi-hard magnetic wire 40 may preferably consist of a metal alloy comprising Co, Ni, Mn and Fe. The semi-hard magnetic material of the wire 40 may for instance have a remanent magnetization of 0.1 T and a coercive force around 1000 A/m.

The "magnetical blocking" of the amorphous or nano-crystalline sensor element 34 in the deactivated state is achieved thanks to the following technical effects.

The amorphous or nano-crystalline sensor element 34 has a mainly circumferential domain structure starting from its outer surface. This structure is determined by the magnetic anisotropy induced during preparation of the element. The magnetic modulating field $H_{mod}$ generates a variation of the circumferential magnetization, which is electromagnetically detected as described above, when the marker is active.

Upon deactivation, when the adjacent semi-hard magnetic wire 40 exposes the sensor element to a DC magnetic field, which is larger than the circumferential anisotropy field, the magnetization of the sensor element 34 will be rotated from the circumferential direction towards the direction of the DC magnetic field from the semi-hard magnetic wire 40. In this case, the amorphous or nano-crystalline sensor element 34 becomes insensitive to the magnetic modulating field $H_{mod}$, and the sensor element may be considered as "magnetically blocked" (marker is deactivated). Then, upon reactivation, the disappearance of the DC magnetic field from the adjacent semi-hard magnetic wire 40 leads to a return to the initial state of the magnetic domain structure of the sensor element 34 (marker becomes active again).

Figure 3:
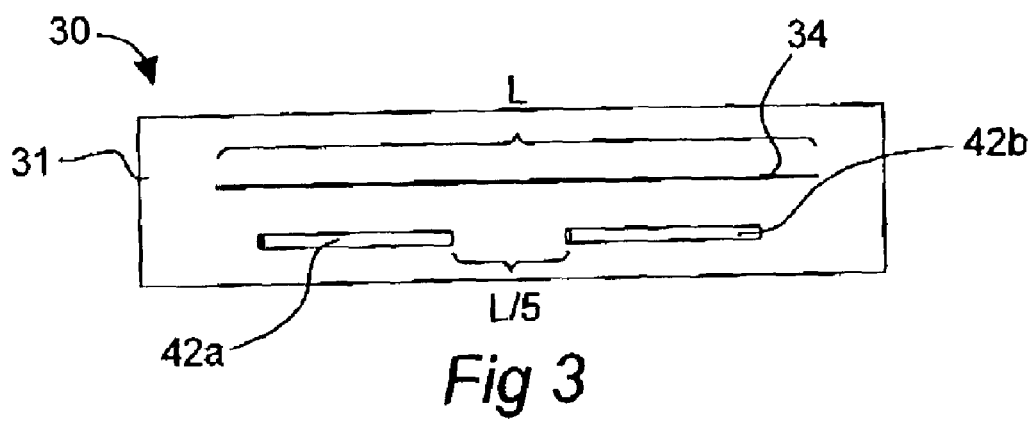
FIG. 3 is a schematic topview of a marker according to a second embodiment of the invention.

A second embodiment of the marker 30 is shown in FIG. 3. Here, the effect of the semi-hard magnetic material is improved by dividing the semi-hard magnetic wire into two separate shorter wires 42a, 42b, which still are positioned adjacently to the amorphous or nano-crystalline sensor element 34 on the substrate 31. Tests have proven that the semi-hard magnetic wires 42a, 42b may preferably be placed apart by approximately ⅕ of the length L of the amorphous sensor element 34, as shown in FIG. 3.

Figure 4:
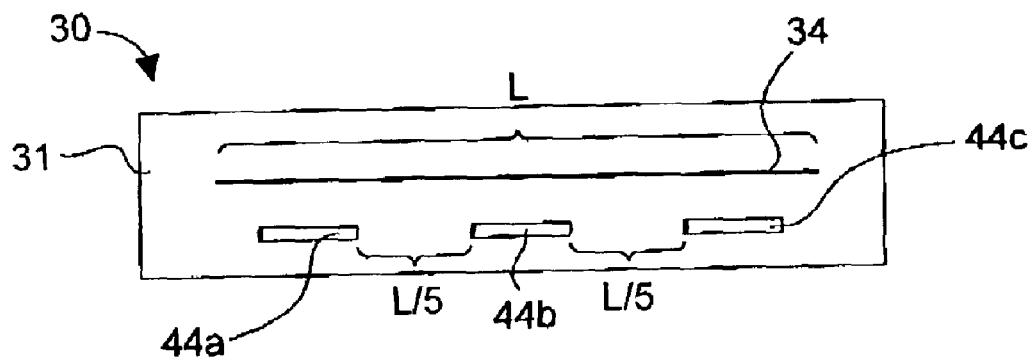
FIG. 4 is a schematic topview of a marker according to a third embodiment of the invention.

A similar embodiment is illustrated in FIG. 4, comprising, however, three separate semi-hard magnetic wires 44a, 44b, 44c, which are spaced apart by approximately ⅕ of the length L of the sensor element 34.

For the embodiments shown in FIGS. 2–4, by controlling the magnetic properties, the length(s) of the semi-hard magnetic wire(s) and its/their position(s) in relation to the amorphous or nano-crystalline sensor element 34, it is possible to control the necessary values of the magnetic influence from the semi-hard magnetic material with respect to the external magnetic modulating field $H_{mod}$ for activating and deactivating the marker, respectively. By selecting these parameters carefully, an accidental deactivation of the tag by the presence of a spurious source of permanent magnetic field in the vicinity of the marker 30 may be avoided.

Figure 5:
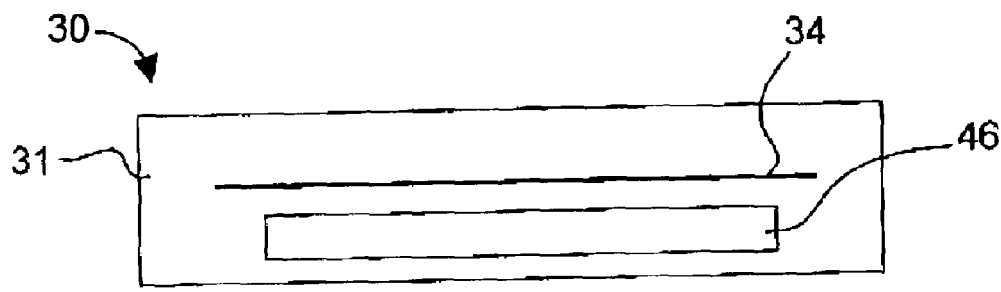
FIG. 5 is a schematic topview of a marker according to a fourth embodiment of the invention.

FIG. 5 illustrates a fourth embodiment of the marker 30. Instead of a wire-shaped semi-hard magnetic material 40, 42, 44, the marker 30 of FIG. 5 is provided with a semi-hard magnetic strip or ribbon 46. The strip or ribbon 46 is positioned on the substrate 31 adjacently to the sensor element 34 in correspondence with the previous embodiments. The strip or ribbon 46 may be made from the same or similar material as the semi-hard magnetic wires of the previous embodiments.

Figure 6:
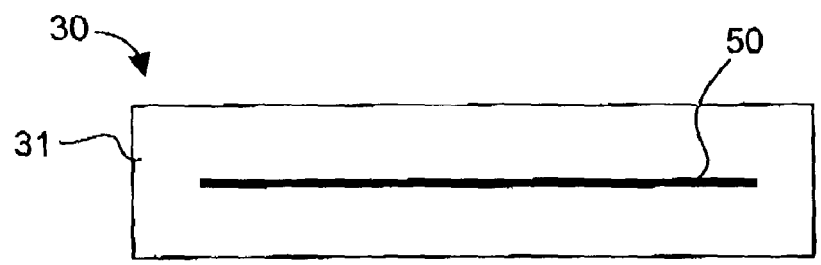
FIG. 6 is a schematic topview of a marker according to a fifth embodiment of the invention.
Figure 7:
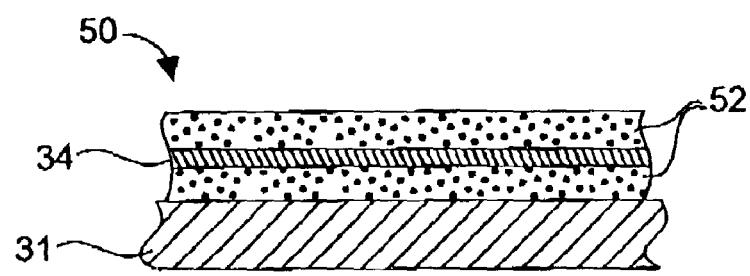
FIG. 7 is a schematic sectional view of the marker shown in FIG. 6.

FIG. 6 illustrates a fifth embodiment of the marker 30. Here, the substrate 31 is provided with a coated wire-shaped element 50, which is shown in more detail as a cross-sectional view in FIG. 7. The wire-shaped element 50 consists of a core 34 of an amorphous or nano-crystalline cobalt-rich soft magnetic material and is equal to the elongated sensor element 34 of the previous embodiments. The core or sensor element 34 is covered with a combination 52 of a semi-hard magnetic powder material and an appropriate binding agent. Preferably, the semi-hard magnetic powder is ferrite or a similar material. In correspondence with the previous embodiments, the embodiment of FIGS. 6 and 7 may be activated and deactivated, respectively, by magnetizing and demagnetizing, respectively, the semi-hard magnetic powder in the coating 52.

Figure 8:
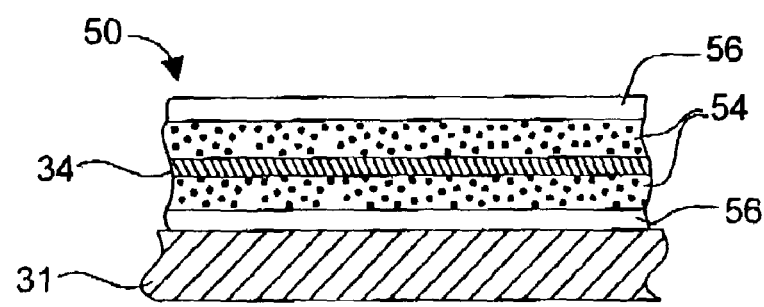
FIG. 8 is a schematic sectional view of a marker according to a sixth embodiment of the invention.

A different embodiment is disclosed in cross-section in FIG. 8. The substrate 31 is identical or equivalent to the previous embodiments. A wire-shaped element 50 is positioned on the substrate 31 in similarity with the embodiment shown in FIG. 7. Here, however, the wire-shaped element 50 comprises a first coating layer 54 of a wax-type material having a relatively low melting point (e.g. around 150° C.) and containing an electrically conductive powder, such as a metal powder. The wire-shaped element 50 also has an outer or second coating layer 56 comprising a shrinkable material, such as non-hardened expanded polyethylene. By exposing the marker 30 to an external energy source, the amorphous or nano-crystalline core (sensor element) 34 will absorb the energy and be heated. The heat generated by the sensor element 34 will melt the wax coating 54 and moreover shrink the outer layer 56, wherein the conductive powder contained in the inner layer 54 will be trapped between the shrunk outer layer and the amorphous or nano-crystalline sensor element 34. Due to the skin-effect and the high frequencies involved in the detection system, all or a majority of the induced currents will flow in the conductive powder around the actual sensor element 34, thereby rendering the sensor element 34 insensitive to the magnetic modulating field and, thus, deactivating the marker 30.

Preferably, the external heat source used for melting the coating 54 is microwave radiation, for instance having the same frequency as is normally used in the detection zone 10. Obviously, when deactivating the marker 30, a higher signal amplitude than normally must be used for the microwave radiation. As an alternative, however, electric or magnetic energy sources are also applicable for heating the marker.

Figure 9:
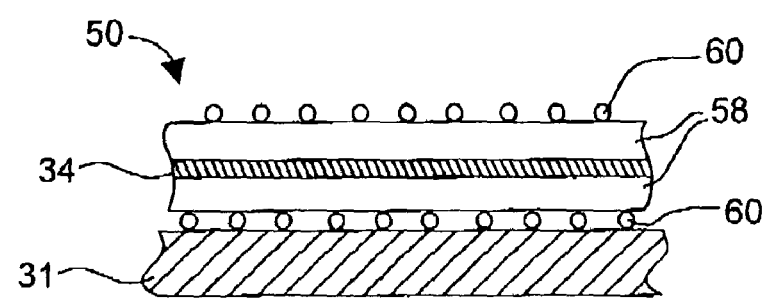
FIG. 9 is a schematic sectional view of a marker according to a seventh embodiment of the invention.

An alternative to the embodiment of FIG. 8 is shown in FIG. 9. Here, instead of the conductive powder, conductive wires, ribbons or strips 60 are wound around the amorphous or nano-crystalline sensor element 34 and an inner wax-type coating 58. The conductive element 60 may either be wound a number of times around the sensor element 34 and the wax-type coating 58, or be applied as circumferential rings outside the wax-type coating 58. The wax-type coating 58 is of a similar type as in FIG. 8 (however without any conductive powder) and is consequently melted at e.g. around 150° C. by exposing the marker to an external energy source. When the wax-type coating 58 has melted, the conductive wire, strip or ribbon 60 will reach electric contact with the amorphous or nano-crystalline sensor element 34.

An improvement of at least some of the embodiments above consists in coating the element(s) with a dielectric material, which allows the required length of the marker to be reduced because of the dielectric loading effect of this coating. Such suitable coating components are for instance plastics or silicas.

Another improvement is to spin a number of artificial fabric fibers around the element(s), followed by a treatment with varnish. The purpose of this would be that a marker with just a very thin amorphous or nano-crystalline wire combined with a thin coating or an additional semi-hard magnetic element will become very small and will be difficult to handle in production. The varnished fibers will keep the conductive or magnetic element in place, thereby securing the marker in a deactivated state.

Yet another improvement would be to provide a double layer of coating, where the function of the outer layer would be to keep the amorphous or nano-crystalline sensor element 34 in constant contact with the semi-hard magnetic element in order not to reactivate the marker undesiredly, when the marker is in its deactivated condition.

In practical applications, a final marker according to any of the above embodiments may be covered by or integrated in non-magnetic materials such as paper, natural or synthetic fibers, glass, plastic, etc.

The invention has been described above with reference to some embodiments. However, other embodiments than the ones disclosed herein are equally possible within the scope of the invention, as defined by the appended independent patent claims.

The invention claimed is:

1. A marker for remote detection of articles, comprising:
   an elongated amorphous or nanocrystalline wire-shaped sensor element having magnetic and electric properties and being adapted to provide an electromagnetic reply signal when receiving an electromagnetic input signal, the elongated sensor element being capable of modulating the electromagnetic reply signal in response to an external magnetic modulating field ($H_{mod}$);
   a coating, which is provided around the elongated sensor element and contains a first non-magnetic and electrically non-conductive element having a relatively low melting point, and a second element, which is electrically conductive and comprises a conductive powder, said coating being adapted to influence either the magnetic or the electric properties of the elongated sensor element in response to incident electromagnetic or magnetic energy, so that either the electromagnetic reply signal itself or the modulation thereof is substantially changed from an active state or eliminated and thereby not detected by the detection system.

2. A marker as in claim 1, further comprising;
   a third element, on the outside of the first and second elements, said third element comprising a heat-shrinkable material.

3. A marker as in claim 1, wherein the coating, which is provided around the elongated sensor element, contains a first non-magnetic and electrically non-conductive element having a relatively low melting point, and a second element in the form of an electrically conductive wire, strip or ribbon, which is wound circumferentially or spirally around the first element.

4. A marker as in claim 1, wherein the first element comprises wax.

* * * * *